(12) United States Patent
Ma et al.

(10) Patent No.: US 11,310,759 B2
(45) Date of Patent: Apr. 19, 2022

(54) METHOD AND DEVICE FOR TRANSMITTING DATA AND STORAGE MEDIUM THEREOF

(71) Applicant: Samsung Electronics Co., Ltd., Suwon-si (KR)

(72) Inventors: Xiaoning Ma, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/058,083

(22) PCT Filed: May 23, 2019

(86) PCT No.: PCT/KR2019/006225
§ 371 (c)(1),
(2) Date: Nov. 23, 2020

(87) PCT Pub. No.: WO2019/225996
PCT Pub. Date: Nov. 28, 2019

(65) Prior Publication Data
US 2021/0204240 A1    Jul. 1, 2021

(30) Foreign Application Priority Data
May 23, 2018  (CN) .......................... 201810504370.7

(51) Int. Cl.
*H04W 68/02* (2009.01)
*H04W 88/08* (2009.01)
(Continued)

(52) U.S. Cl.
CPC ............. *H04W 60/04* (2013.01); *H04W 8/08* (2013.01); *H04W 48/18* (2013.01); *H04W 68/005* (2013.01)

(58) Field of Classification Search
CPC ..... H04W 8/08; H04W 80/10; H04W 68/005; H04W 36/0011; H04W 36/0022;
(Continued)

(56) References Cited

U.S. PATENT DOCUMENTS

2013/0294261 A1   11/2013  Ghosh et al.
2015/0103721 A1    4/2015  Yi et al.
(Continued)

OTHER PUBLICATIONS

"3rd Generation Partnership Project; Technical Specification Group Services and System Aspects; Study on Cellular IoT support and evolution for the 5G System (Release 16)", 3GPP TR 23.724 V0.3.0 (Apr. 2018), 154 pages.
(Continued)

*Primary Examiner* — Gary Lafontant

(57) ABSTRACT

The embodiments of the present disclosure propose a method performed at a first node for transmitting data, comprising: receiving downlink data to be transmitted to a User Equipment (UE) in a non-connected state; and determining whether to buffer the downlink data. The method further comprises: when it is determined that the downlink data is to be buffered, if the first node is a first type of node, determining that a paging procedure is not to be initiated for the UE in the non-connected state, or if the first node is a second type of node, notifying the second node that the downlink data has been buffered, so that the second node determines that the paging procedure is not to be initiated for the UE in the non-connected state. There are further provided a method performed at a second node and corresponding devices and storage media.

15 Claims, 11 Drawing Sheets

(51) Int. Cl.
*H04W 60/04* (2009.01)
*H04W 8/08* (2009.01)
*H04W 48/18* (2009.01)
*H04W 68/00* (2009.01)

(58) Field of Classification Search
CPC . H04W 76/25; H04W 36/0033; H04W 68/00; H04W 72/042; H04W 74/006; H04W 48/12; H04W 36/02; H04W 72/1289; H04W 12/037; H04W 8/245
See application file for complete search history.

(56) References Cited

U.S. PATENT DOCUMENTS

| | | | |
|---|---|---|---|
| 2016/0100443 A1 | 4/2016 | Li et al. | |
| 2016/0128078 A1 | 5/2016 | Murthy et al. | |
| 2018/0199398 A1* | 7/2018 | Dao | H04L 67/14 |
| 2021/0211960 A1* | 7/2021 | Ryu | H04W 36/14 |

OTHER PUBLICATIONS

"3rd Generation Partnership Project; Technical Specification Group Services and System Aspects; System Architecture for the 5G System; Stage 2 (Release 15)", 3GPP TS 23.501 V15.1.0 (Mar. 2018), 201 pages.
Intel, "Solution of High latency communication and Power Saving Function", SA WG2 Meeting #126, Feb. 26-Mar. 2, 2018, S2-182206, 9 pages.
"3rd Generation Partnership Project; Technical Specification Group Services and System Aspects; Procedures for the 5G System; Stage 2 (Release 15)", 3GPP TS 23.502 V2.0 0 (Dec. 2017), 260 pages.
"3rd Generation Partnership Project; Technical Specification Group Services and System Aspects; Study on optimizations to support high latency communications; Stage 2 (Release 13)", 3GPP TR 23.709 V13.0.0 (Jun. 2015), 32 pages.
Huawei et al., "Updates procedures to support packet lossless N3 UPF relocation", 3GPP TSG SA WG2 Meeting #122, Jun. 26-Jun. 30, 2017, S2-174331, 12 pages.
Supplementary European Search Report dated May 20, 2021 in connection with European Patent Application No. 19 80 7633, 11 pages.
Ericsson et al., "KI3: Solution for High latency communication", SA WG2 Meeting #127, Apr. 16-20, 2018, S2-184628, 14 pages.
Notification of Transmittal of the International Search Report and the International Searching Authority, or the Declaration dated Aug. 29, 2019 in connection with International Patent Application No. PCT/KR2019/006225, 11 pages.

* cited by examiner

[Fig. 1]
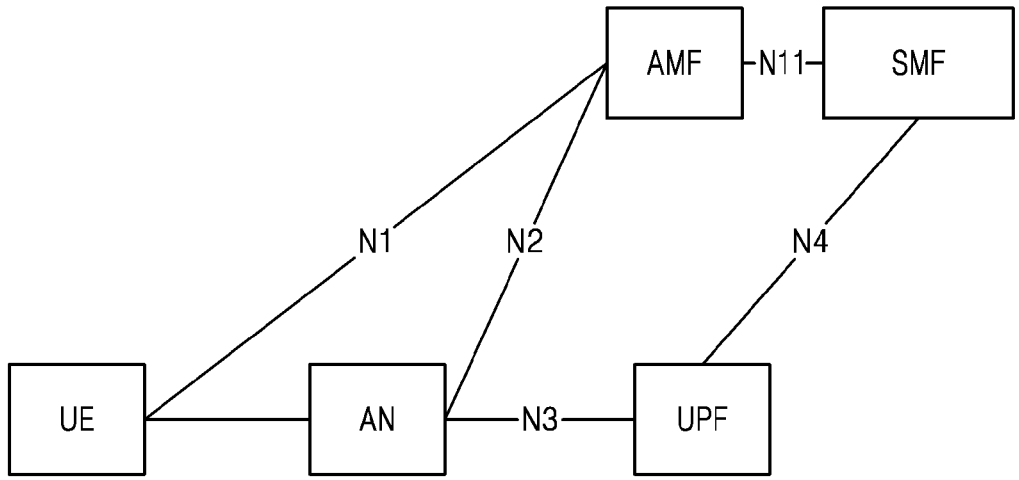
[Fig. 2]
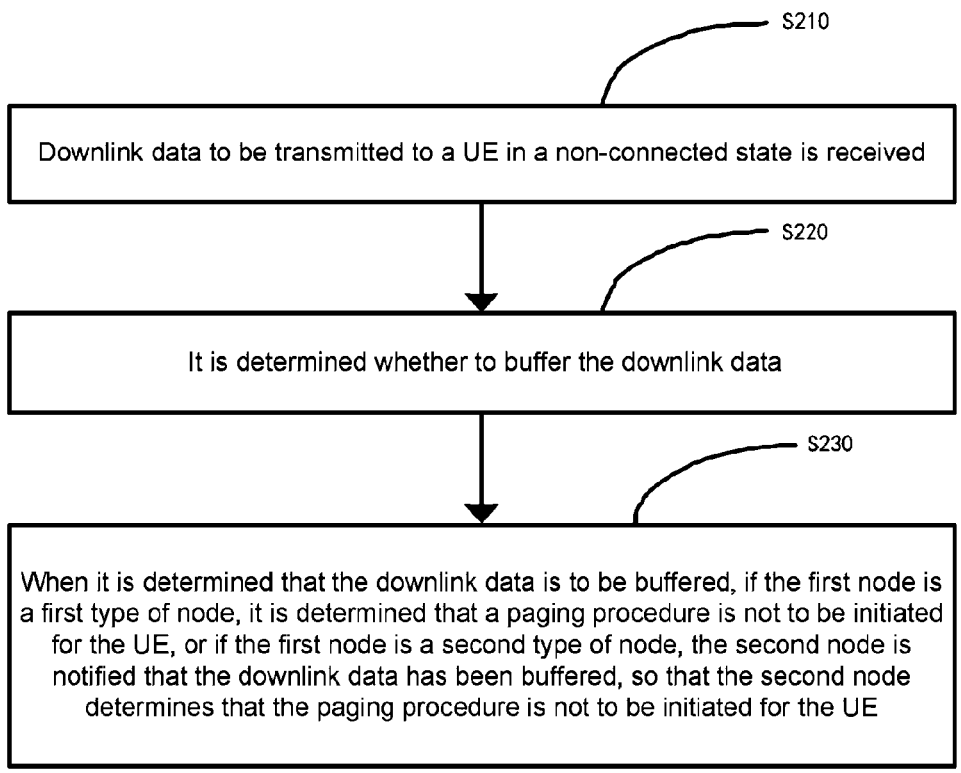

[Fig. 3]
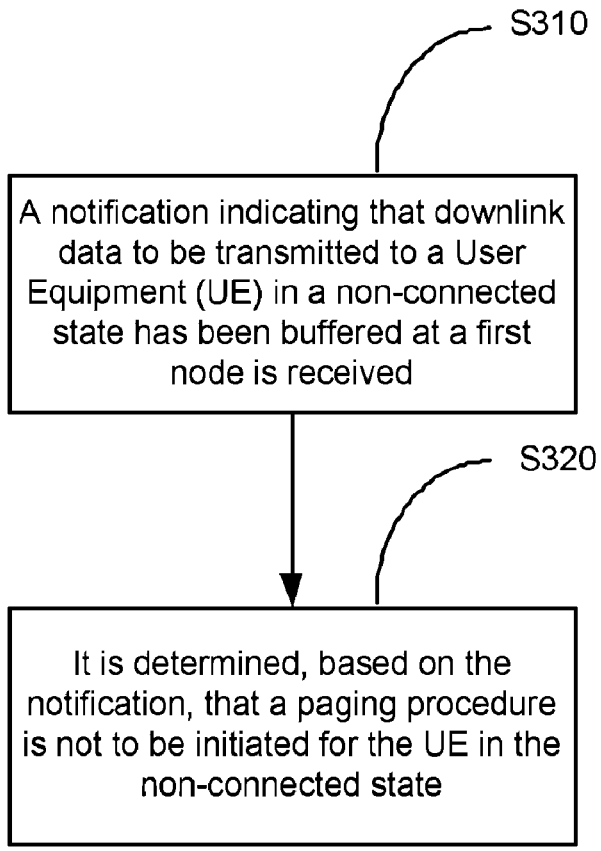
[Fig. 4]
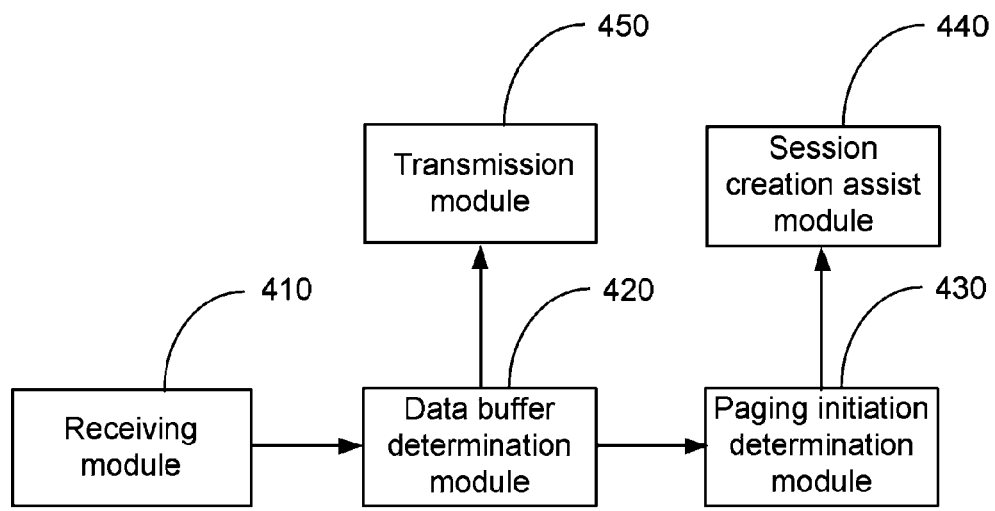

[Fig. 5]
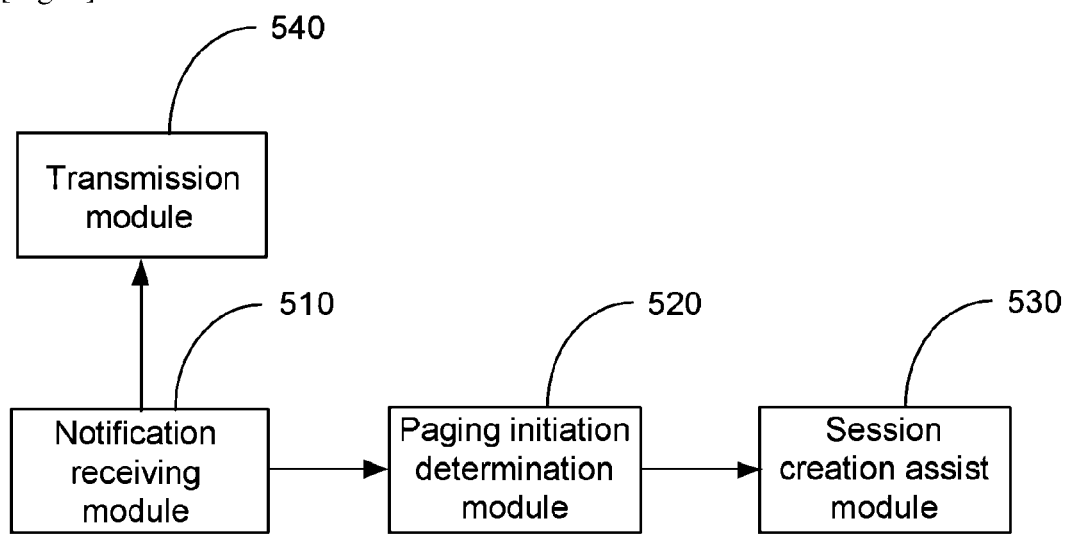

[Fig. 6A]
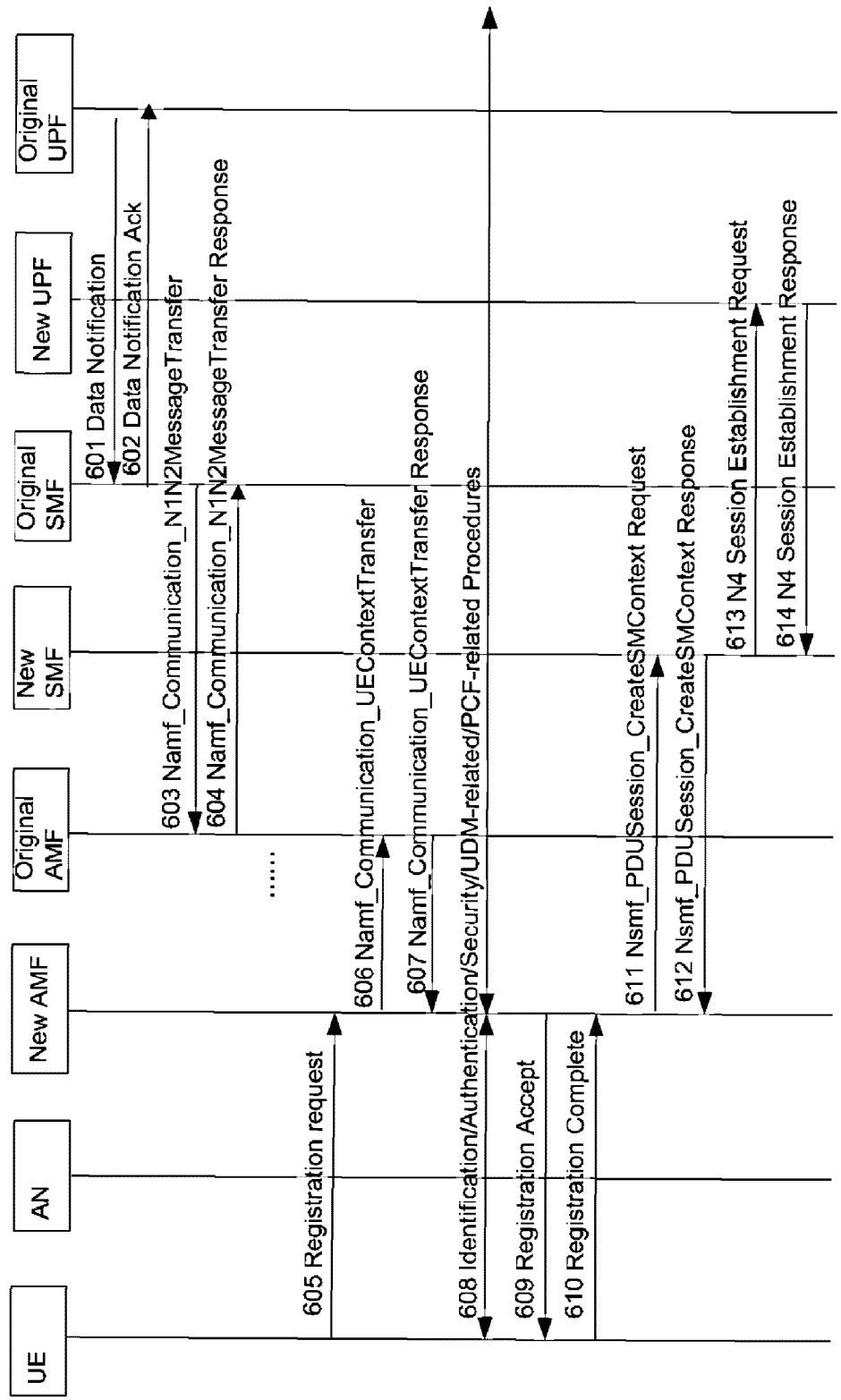

[Fig. 6B]
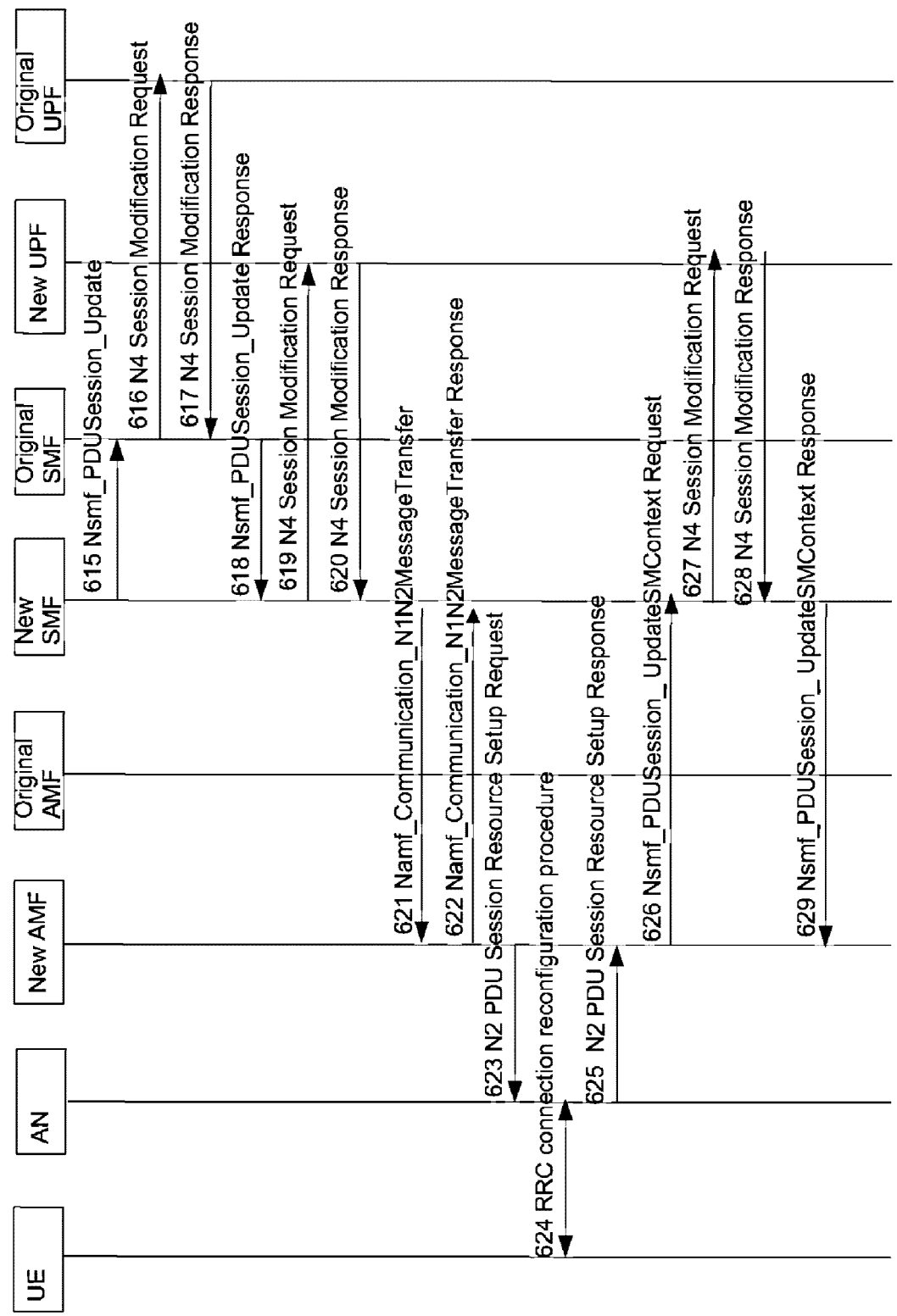

[Fig. 7A]
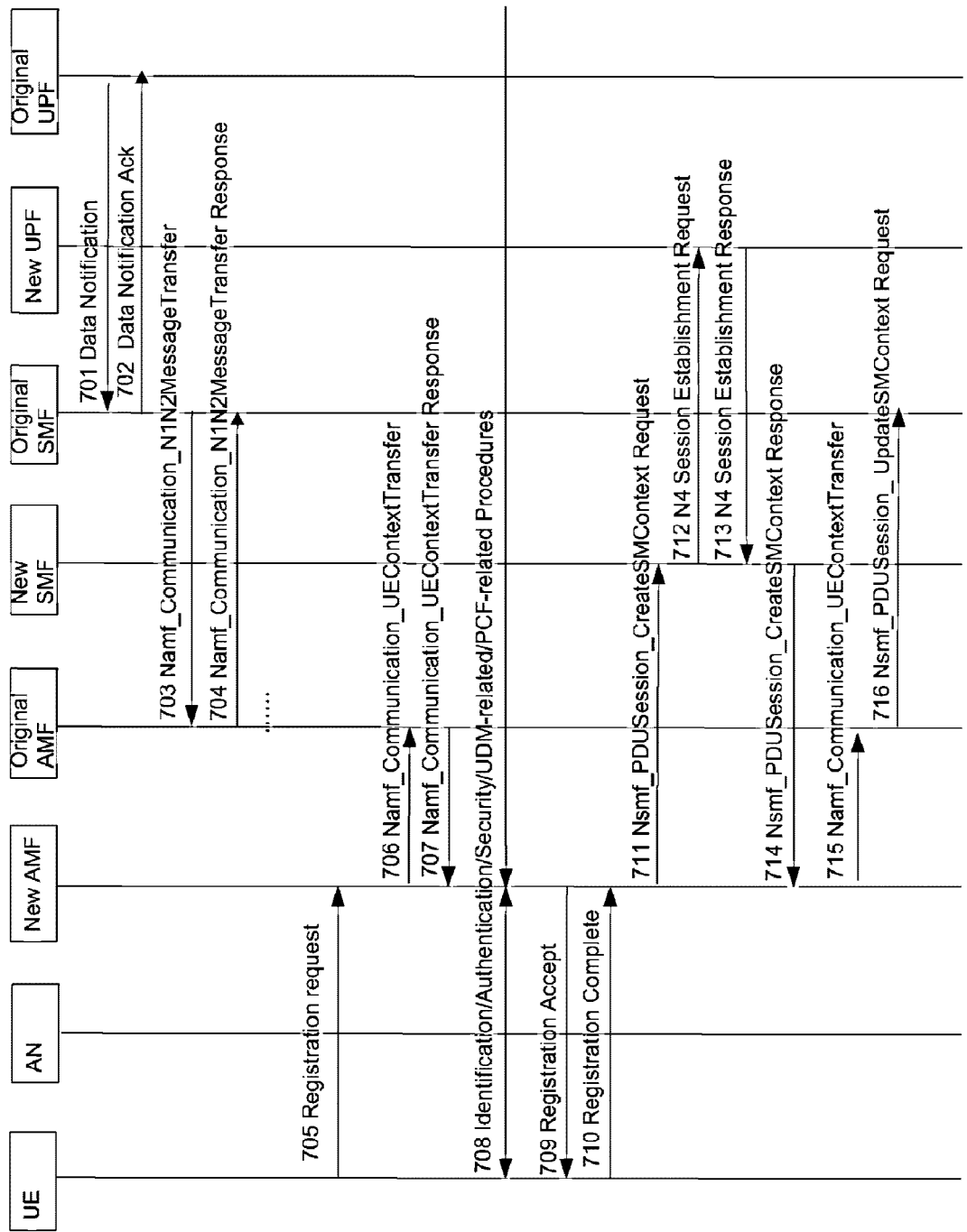

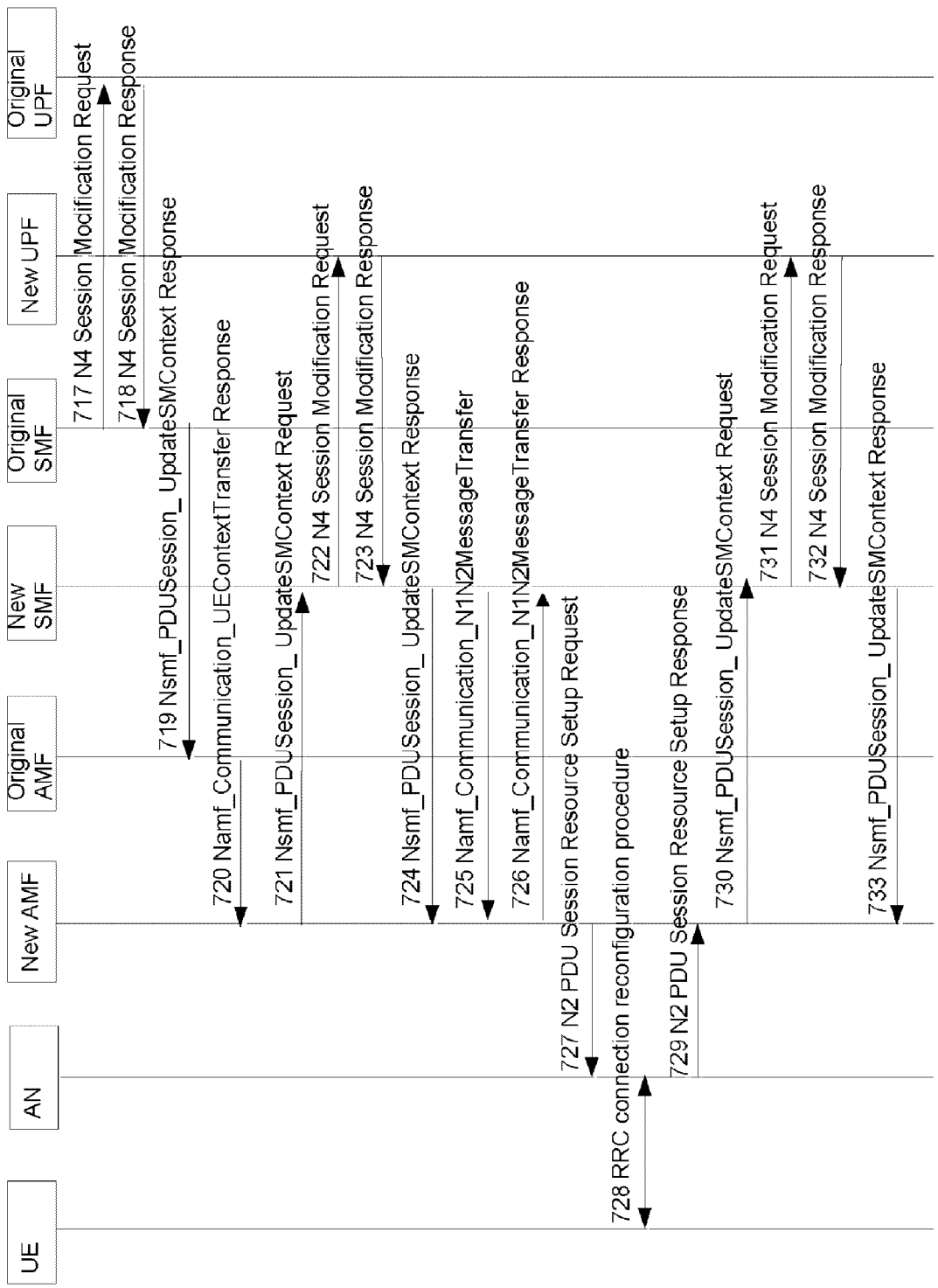

[Fig. 8A]
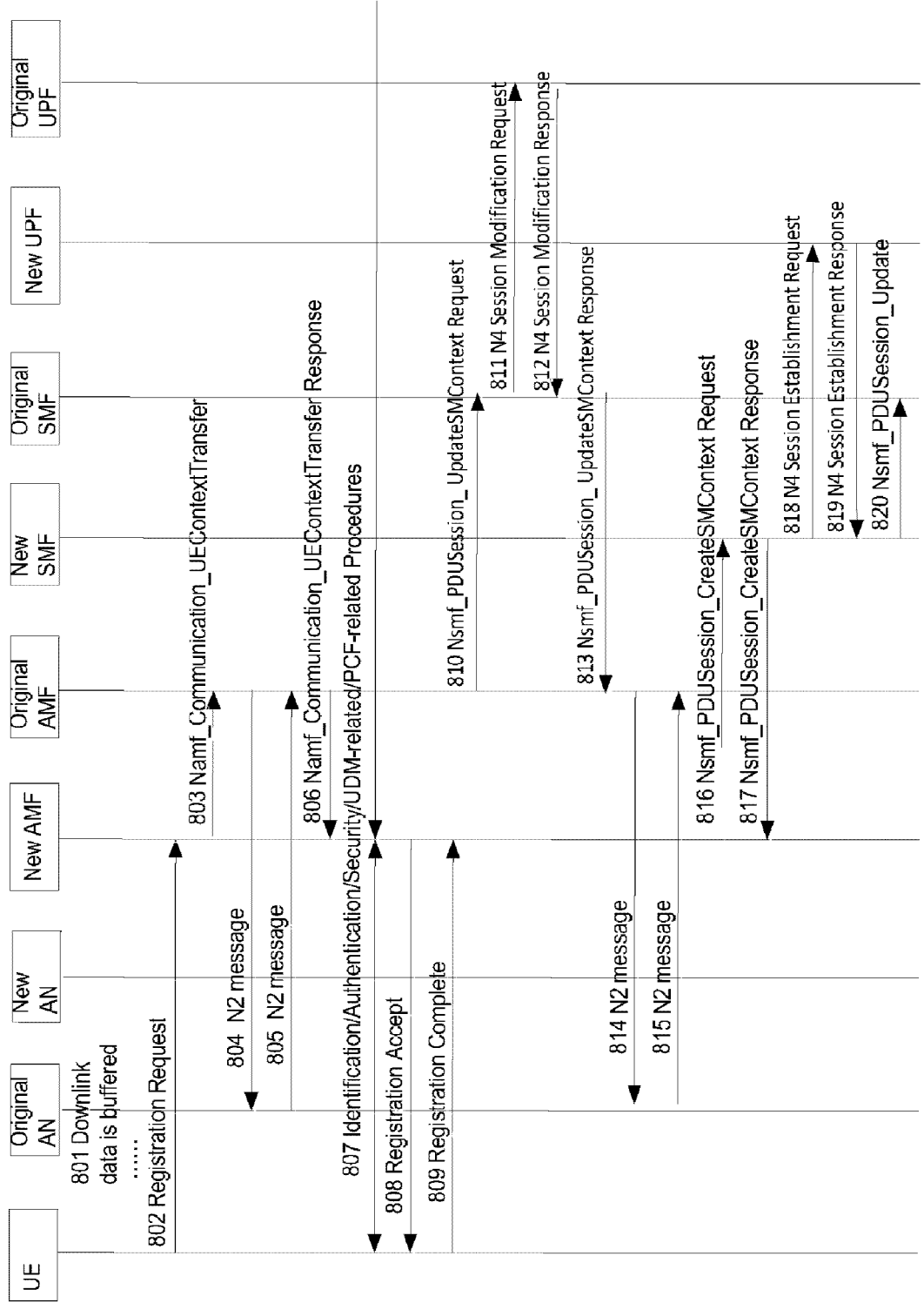

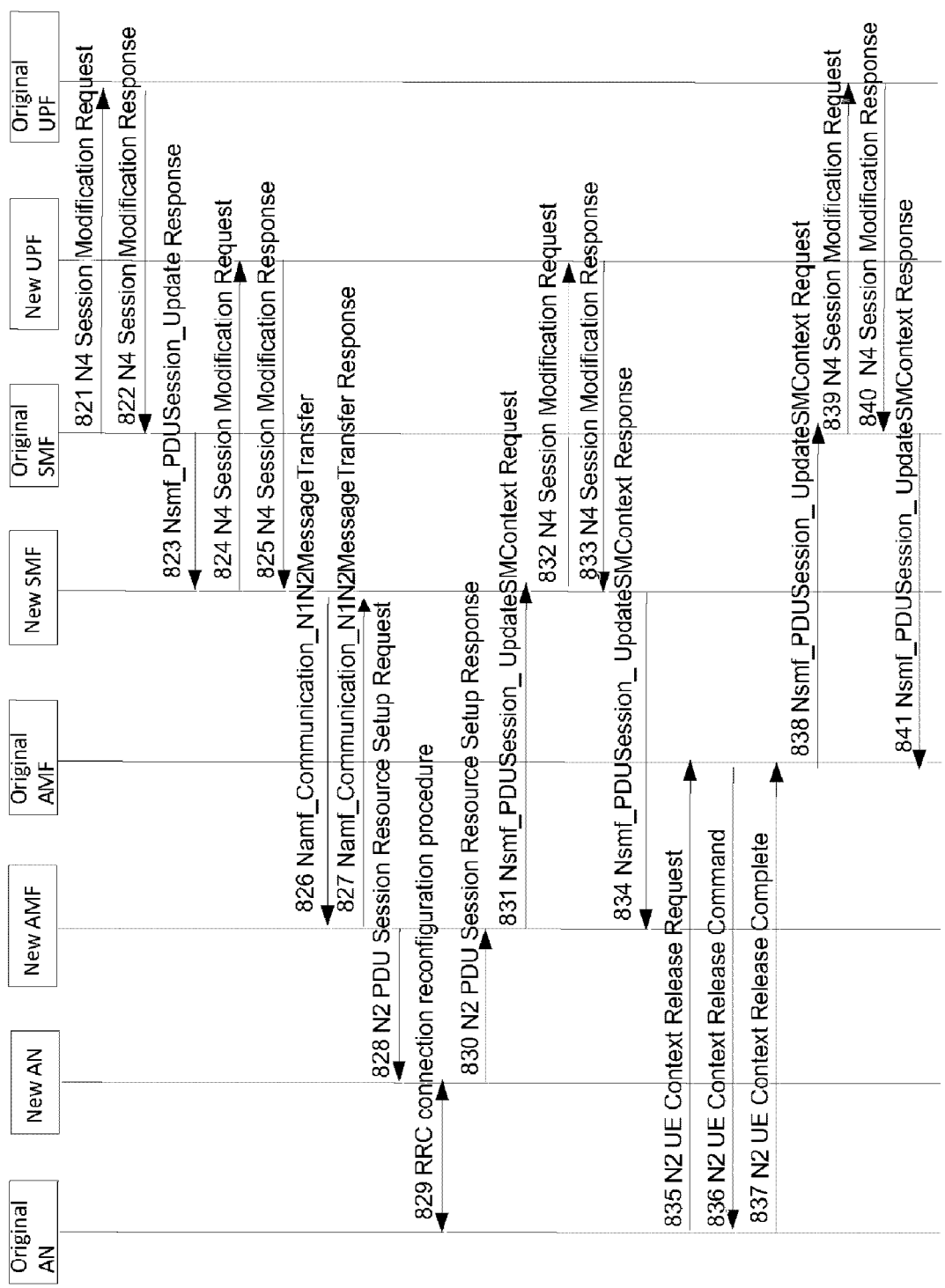
[Fig. 8B]

[Fig. 9]
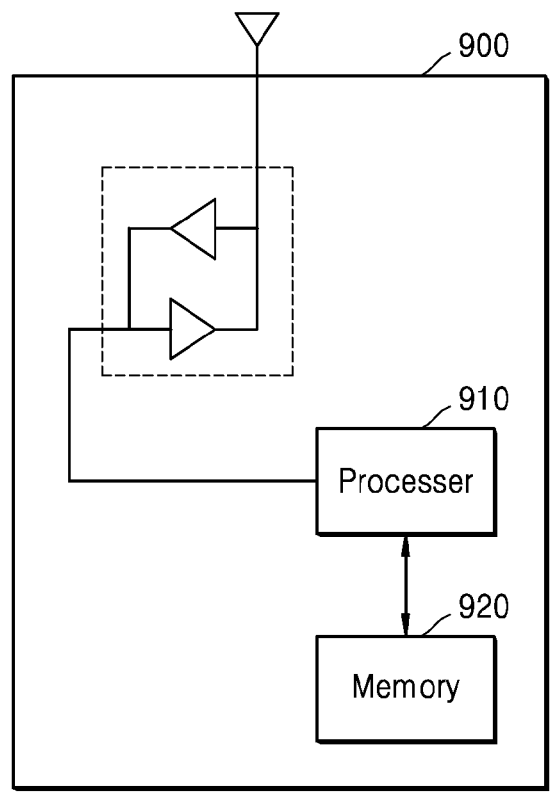
[Fig. 10]
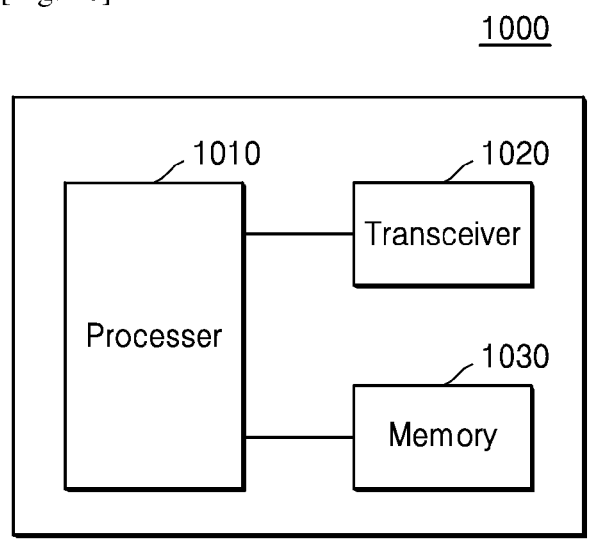

[Fig. 11]
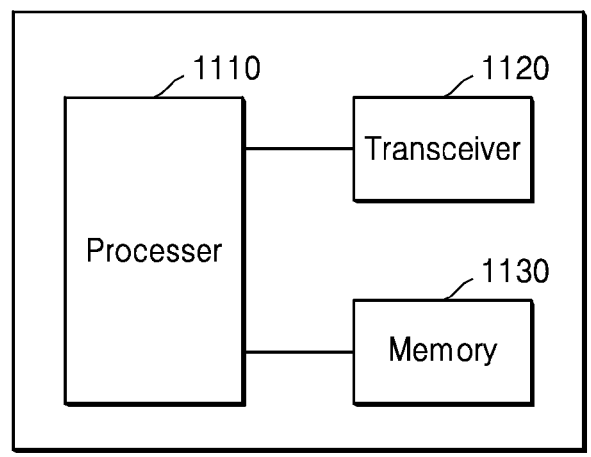
[Fig. 12]
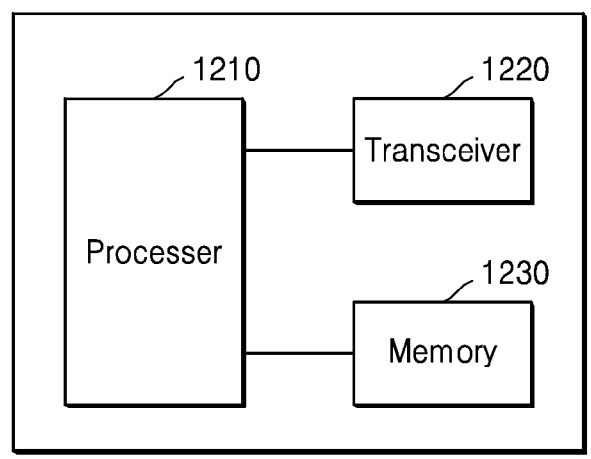

METHOD AND DEVICE FOR TRANSMITTING DATA AND STORAGE MEDIUM THEREOF

CROSS-REFERENCE TO RELATED APPLICATIONS

This application is a 371 of International Application No. PCT/KR2019/006225 filed on May 23, 2019, which claims priority to Chinese Patent Application No. 201810504370.7 filed on May 23, 2018, the disclosures of which are herein incorporated by reference in their entirety.

BACKGROUND

1. Field

The present disclosure relates to the field of mobile communication technologies, and more particularly, to a method and device for transmitting data, and a storage medium thereof.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The embodiments of the present disclosure propose a method performed at a first node for transmitting data, comprising: receiving downlink data to be transmitted to a User Equipment (UE) in a non-connected state; and determining whether to buffer the downlink data. The method further comprises: when it is determined that the downlink data is to be buffered, if the first node is a first type of node, determining that a paging procedure is not to be initiated for the UE in the non-connected state, or if the first node is a second type of node, notifying the second node that the downlink data has been buffered, so that the second node determines that the paging procedure is not to be initiated for the UE in the non-connected state. There are further provided a method performed at a second node and corresponding devices and storage media.

BRIEF DESCRIPTION OF THE DRAWINGS

The above and other features of the present disclosure will become more apparent from the following detailed description with reference to the accompanying drawings, in which:

FIG. 1 illustrates a schematic diagram of system architecture in a 5G communication system.

FIG. 2 illustrates a flowchart of a method performed at a first node for transmitting data according to an embodiment of the present disclosure.

FIG. 3 illustrates a flowchart of a method performed at a second node for transmitting data according to an embodiment of the present disclosure.

FIG. 4 illustrates a schematic block diagram of a first node for transmitting data according to an embodiment of the present disclosure.

FIG. 5 illustrates a schematic block diagram of a second node for transmitting data according to an embodiment of the present disclosure.

FIGS. 6A and 6B illustrate schematic flowcharts of one specific implementation of a method for transmitting data according to an embodiment of the present disclosure.

FIGS. 7A and 7B illustrate schematic flowcharts of another specific implementation of a method for transmitting data according to an embodiment of the present disclosure.

FIGS. 8A and 8B illustrate schematic flowcharts of another specific implementation of a method for transmitting data according to an embodiment of the present disclosure.

FIG. 9 schematically illustrates a block diagram of a device according to an embodiment of the present disclosure.

In the accompanying drawings, the same or similar structures are identified by the same or similar reference signs.

FIG. 10 schematically illustrates a block diagram of a first node 1000 according to an embodiment of the present disclosure.

FIG. 11 schematically illustrates a block diagram of a second node 1100 according to an embodiment of the present disclosure.

FIG. 12 schematically illustrates a block diagram of a device 1200 according to an embodiment of the present disclosure.

DETAILED DESCRIPTION

In order to solve at least some of the above problems, the embodiments of the present disclosure provide a device and method for transmitting a signal.

According to a first aspect of the present disclosure, there is provided a method performed at a first node for transmitting data, comprising:
receiving downlink data to be transmitted to a User Equipment (UE) in a non-connected state;
determining whether to buffer the downlink data; and
when it is determined that the downlink data is to be buffered,
if the first node is a first type of node, determining that a paging procedure is not to be initiated for the UE in the non-connected state, or
if the first node is a second type of node, notifying the second node that the downlink data has been buffered, so that the second node determines that the paging procedure is not to be initiated for the UE in the non-connected state.

In some embodiments, determining whether to buffer the downlink data may comprise: determining, based on a priority of the downlink data, whether to buffer the downlink data. Here, if the downlink data is data of a high priority, it is determined that the downlink data is to be transmitted immediately, rather than to be buffered, and if the downlink data is not data of a high priority, it is determined that the downlink data is to be buffered.

In some embodiments, the method may further comprise: determining, based on occurrence of a predefined event, that the buffered data is to be transmitted to the UE in the non-connected state. Here, the predefined event comprises at least one of: the UE actively returning to a connected state, occurrence of downlink data to be transmitted immediately, timeout of a predefined timer, and an event that a predefined upper limit of the buffered data has been reached.

In some embodiments, if the first node is the first type of node, after determining that the downlink data is to be buffered, the first node may further notify the second node that the downlink data has been buffered.

In some embodiments, a notification to the second node may carry an information element indicating that the data is buffered by the first node.

In some embodiments, notifying the second node that the downlink data has been buffered may comprise: transmitting, to a third node, a message carrying an information element indicating that the data is buffered by the first node, so that the third node notifies the second node that the data is buffered by the first node.

In some embodiments, the first type of node may be an Access Node (AN), the second type of node may be an User Plane Functional entity (UPF), the second node may be an Access Mobility management Functional entity (AMF), and the third node may be a Session Management Functional entity (SMF).

In some embodiments, the UE actively returning to a connected state may comprise the UE updating its registration area. In this case, the method may further comprise: assisting in creation of a user plane session between the UE and the updated registration area, so that the buffered data may be transmitted using the created user plane session.

According to a second aspect of the present disclosure, there is provided a method performed at a second node for transmitting data, comprising:
receiving a notification indicating that downlink data to be transmitted to a User Equipment (UE) in a non-connected state has been buffered at a first node.

In some embodiments, the method may comprise:
determining, based on the notification, that a paging procedure is not to be initiated for the UE in the non-connected state.

In some embodiments, the method may comprise: determining, based on occurrence of a predefined event, that the buffered data is to be transmitted to the UE in the non-connected state. Here, the predefined event comprises at least one of: the UE actively returning to a connected state, occurrence of downlink data to be transmitted immediately, timeout of a predefined timer, and an event that a predefined upper limit of the buffered data has been reached.

In some embodiments, the notification is received from the first node via a third node, and the method may further comprise: receiving, from the third node, a message comprising an information element indicating a forwarding data channel address of the first node.

In some embodiments, the method may further comprise: transmitting, to another second node, a message comprising an information element indicating that the data is buffered by the first node and/or the message comprising the information element indicating the forwarding data channel address of the first node, so that the other second node forwards the message to another third node.

In some embodiments, the other second node may be a second node to which the UE is connected when the UE updates its registration area, and the message which is transmitted to the other second node and comprises the information element indicating that the data is buffered by the first node may be used to trigger the other second node to initiate a Packet Data Unit (PDU) session establishment procedure.

In some embodiments, the first node may be an User Plane Functional entity (UPF), the second node and the other second node may be Access Mobility management Functional entities (AMF), and the third node and the other third node may be Session Management Functional entities (SMF).

In some embodiments, the UE actively returning to a connected state may comprise the UE updating its registration area (for example, entering a new registration area). In this case, the method shown in FIG. 2 may further comprise: assisting in creation of a user plane session between the UE and the updated registration area, so that the buffered data may be transmitted using the created user plane session.

According to a third aspect of the present disclosure, there is provided a first node for transmitting data, comprising: a receiving module, a data buffer determination module, and a paging initiation determination module. The receiving module is configured to receive downlink data to be transmitted to a User Equipment (UE) in a non-connected state. The data buffer determination module is configured to determine whether to buffer the downlink data. The paging initiation determination module is configured to, when it is determined that the downlink data is to be buffered, if the first node is a first type of node, determine that a paging procedure is not to be initiated for the UE in the non-connected state, or if the first node is a second type of node, notify the second node that the downlink data has been buffered, so that the second node determines that the paging procedure is not to be initiated for the UE in the non-connected state.

According to a fourth aspect of the present disclosure, there is provided a second node for transmitting data. The second node comprises: a notification receiving module. The notification receiving module is configured to receive a notification indicating that downlink data to be transmitted to a User Equipment (UE) in a non-connected state has been buffered at a first node.

According to a fifth aspect of the present disclosure, there is provided a device for transmitting data, comprising:

a processor; and a memory configured to store machine readable instructions, which, when executed by the processor, cause the processor to perform any method described above.

According to a sixth aspect of the present disclosure, there is provided a computer readable storage medium having stored thereon executable instructions which, when executed by a processor, cause the processor to perform any method described above.

According to the technical solutions of the embodiments of the present disclosure, it may be determined by the first node (for example, the UPF or the AN) itself whether to buffer the downlink data to be transmitted to the UE in the non-connected state, and in a case where the downlink data is to be buffered, paging for the UE may not be initiated, thereby enabling the UE to achieve saving of power consumption.

In order to make the purposes, technical solutions and advantages of the present application more clear and apparent, the present application will be further described in detail below in conjunction with the accompanying drawings. It should be illustrated that the description below is illustrated merely by way of example instead of limiting the present disclosure. In the following description, numerous specific details are set forth to provide a more thorough understanding of the present disclosure. However, it will be obvious to those skilled in the art that the present disclosure may be practiced without these specific details. In other instances, well-known circuits, materials or methods are not described in detail in order to avoid obscuring the present disclosure.

Reference throughout this specification to "an embodiment", "an embodiment", "one example" or "an example" means that a particular feature, structure, or characteristic described in connection with the embodiment or example is included in at least an embodiment of the present disclosure. Thus, the appearances of the phrase "in an embodiment", "in an embodiment", "one example" or "an example" in various places throughout this specification are not necessarily all referring to the same embodiment or example. Furthermore, the particular features, structures, or characteristics may be combined in any suitable combination and/or sub-combination in one or more embodiments or examples. In addition, it should be understand by those skilled in the art that the accompanying drawings provided herein are for the purpose of illustration, and are not necessarily drawn to scale. A term "and/or" used herein comprises any or all combinations of one or more listed related items.

As a new generation of mobile communication systems, 5G communication systems include a variety of network elements. FIG. 1 illustrates a schematic diagram of system architecture in a 5G communication system. As shown in FIG. 1, network elements in the 5G communication system may be classified into different types of elements, for example, User Equipments (UEs), Access Nodes (ANs), Access Mobility management Functional entities (AMF), Session Management Functional entities (SMF), and User Plane Functional entities (UPF) etc., according to tasks undertaken.

After a UE enters a CM-IDLE state, when a UPF receives downlink data for the UE, the UPF transmits a Downlink Data Notification (DDN) to an SMF, and expects the UE to reconstruct a user plane. The SMF then notifies the AMF, and the AMF initiates a paging procedure to an AN. After the UE receives paging signaling, the UE returns to a CM-CONNECTED state, and restores a user plane function with the UPF to receive data.

If the UE enters the CM-IDLE state, the SMF may instruct the UPF to temporarily buffer data on the UPF (without expecting the UE to reconstruct the plane) after receiving the DDN and not transmit the DDN to the SMF at the same time. The SMF may also determine how long the data is buffered or a number of data packets to be buffered.

After the UE enters a RRC-INACTIVE state, the AN initiates an RAN paging procedure after receiving the downlink data of the UE. After the UE receives the paging signaling, the UE returns to a RRC-CONNECTED state, and recovers a wireless link with the AN to receive the downlink data.

The above process may cause the UE which has entered a non-connected state (for example, the CM-IDLE state or the RRC-INACTIVE state) to be frequently woken up through paging signaling (for example, paging or RAN paging) to re-enter the connected state (for example, the CM-CONNECTED state or the RRC-CONNECTED state), thereby resulting in a large power consumption of the UE.

Therefore, there is a need for a solution which can reduce a number of times the UE is paged, so as to at least partially solve the above problems.

FIG. 2 illustrates a flowchart of a method performed at a first node for transmitting data according to an embodiment of the present disclosure. As shown in FIG. 2, the method comprises step S210, in which downlink data to be transmitted to a User Equipment (UE) in a non-connected state is received.

The "non-connected state" described herein refers to a state in which a connection for signal transmission between the UE and a network device is not established, for example, an CM-IDLE state, a RRC-INACTIVE state, or any other similar states.

In operation S220, it is determined whether to buffer the downlink data.

In some examples, the determination may be made based on a priority of the downlink data. In this case, determining whether to buffer the downlink data may comprise: determining, based on a priority of the downlink data, whether to buffer the downlink data. Specifically, if the downlink data is data of a high priority, it is determined that the downlink data is to be transmitted immediately, rather than to be buffered, and if the downlink data is not data of a high priority, it is determined that the downlink data is to be buffered. Herein, the data may be prioritized using any method for dividing data into data of a high priority and data of a low priority in the related art, which will not be described in detail here.

For example, a network node such as the UPF etc. may determine the priority of the downlink data and add an Information Element (IE) of "Flow Priority" in a GTP-U data packet header of the downlink data. The UPF may use the IE to indicate how important the data carried by the data packet is for the UE. Therefore, the AN may decide whether to initiate a RAN Paging procedure immediately according to the IE. It should be illustrated that the technical solutions according to the embodiments of the present disclosure are not limited thereto, and it may be determined whether to buffer the downlink data according to any other feasible manner (for example, but not limited to, a buffer capacity, a data transmission scheduling policy, etc.)

In step S230, when it is determined that the downlink data is to be buffered, if the first node is a first type of node, it is determined that a paging procedure is not to be initiated for the UE in the non-connected state, or if the first node is a second type of node, the second node is notified that the downlink data has been buffered, so that the second node determines that the paging procedure is not to be initiated for the UE in the non-connected state.

The above notification to the second node may be IEs of a "Gateway buffered data indication", an "AN buffered data indication", or any message or information which may implement a similar function, and the present disclosure is not limited by a specific implementation.

Alternatively, the method shown in FIG. 2 may further comprise: determining, based on occurrence of a predefined event, that the buffered data is to be transmitted to the UE in the non-connected state. Here, the predefined event may comprise, but not limited to, at least one of: the UE actively returning to a connected state, occurrence of downlink data to be transmitted immediately (for example, data of a high priority for the UE), timeout of a predefined timer, and an event that a predefined upper limit of the buffered data has been reached.

In some examples, if the first node is the first type of node, after determining that the downlink data is to be buffered, the first node may further notify the second node that the downlink data has been buffered.

In some examples, a notification to the second node may carry an information element indicating that the data is buffered by the first node.

In some examples, notifying the second node that the downlink data has been buffered may comprise: transmitting, to a third node, a message carrying an information element indicating that the data is buffered by the first node, so that the third node notifies the second node that the data is buffered by the first node.

In some examples, the first type of node may be an Access Node (AN), the second type of node may be an User Plane Functional entity (UPF), the second node may be an Access Mobility management Functional entity (AMF), and the third node may be a Session Management Functional entity (SMF). However, the technical solutions according to the embodiments of the present disclosure are not limited thereto, and the first type of node, the second type of node, the second node, and the third node may also be corresponding nodes which have similar functions in an existing communication system or a future communication system, respectively, and should not be limited to the AN, the UPF, or the AMF.

In some examples, the UE actively returning to a connected state may comprise the UE updating its registration area (for example, entering a new registration area). In this case, the method shown in FIG. 2 may further comprise: assisting in creation of a user plane session between the UE and the updated registration area, so that the buffered data may be transmitted using the created user plane session.

FIG. 3 illustrates a flowchart of a method performed at a second node for transmitting data according to an embodiment of the present disclosure. As shown in FIG. 3, the method comprises step S310, in which a notification indicating that downlink data to be transmitted to a User Equipment (UE) in a non-connected state has been buffered at a first node is received.

The above notification to the second node may be IEs of a "Gateway buffered data indication", an "AN buffered data indication", or any message or information which may implement a similar function, and the present disclosure is not limited by a specific implementation.

Alternatively, in step s320, it is determined, based on the notification, that a paging procedure is not to be initiated for the UE in the non-connected state.

Alternatively, the method shown in FIG. 3 may further comprise: determining, based on occurrence of a predefined event, that the buffered data is to be transmitted to the UE in the non-connected state. Here, the predefined event may comprise, but not limited to, at least one of: the UE actively returning to a connected state, occurrence of downlink data to be transmitted immediately (for example, data of a high priority for the UE), timeout of a predefined timer, and an event that a predefined upper limit of the buffered data has been reached.

In some examples, the notification is received from the first node via a third node, and the method shown in FIG. 3 may further comprise: receiving, from the third node, a message comprising an information element indicating a forwarding data channel address of the first node.

In some examples, the method shown in FIG. 3 may further comprise: transmitting, to another second node, a message comprising an information element indicating that the data is buffered by the first node and/or the message comprising the information element indicating the forwarding data channel address of the first node, so that the other second node forwards the message to another third node.

In some examples, the other second node is a second node to which the UE connects when the UE updates its registration area, and the message which is transmitted to the other second node and comprises the information element indicating that the data is buffered by the first node is used to trigger the other second node to initiate a Packet Data Unit (PDU) session establishment procedure.

In some examples, the first node may be an User Plane Functional entity (UPF), the second node and the other second node may be Access Mobility management Functional entities (AMF), and the third node and the other third node may be Session Management Functional entities (SMF). However, the technical solutions according to the embodiments of the present disclosure are not limited thereto, and the first node, the second node, and the third node may also be corresponding nodes which have similar functions in an existing communication system or a future communication system, respectively, and should not be limited to the UPF, the AMF, or the SMF.

In some examples, the UE actively returning to a connected state may comprise the UE updating its registration area (for example, entering a new registration area). In this case, the method shown in FIG. 3 may further comprise: assisting in creation of a user plane session between the UE and the updated registration area, so that the buffered data may be transmitted to the UE using the created user plane session.

FIG. 4 illustrates a schematic block diagram of a first node for transmitting data according to an embodiment of the present disclosure. As shown in FIG. 4, the first node may comprise a receiving module 410, a data buffer determination module 420 and a paging initiation determination module 430.

The receiving module 410 is configured to receive downlink data to be transmitted to a User Equipment (UE) in a non-connected state.

The "non-connected state" described herein refers to a state in which a connection for signal transmission between the UE and a network device is not established, for example, an CM-IDLE state, a RRC-INACTIVE state, or any other similar states.

The data buffer determination module 420 is configured to determine whether to buffer the downlink data.

In some examples, the determination may be made based on a priority of the downlink data. In this case, determining whether to buffer the downlink data may comprise: determining, based on a priority of the downlink data, whether to buffer the downlink data. Specifically, if the downlink data is data of a high priority, it is determined that the downlink data is to be transmitted immediately, rather than to be buffered, and if the downlink data is not data of a high priority, it is determined that the downlink data is to be buffered. Herein, the data may be prioritized using any method for dividing data into data of a high priority and data of a low priority in the related art, which will not be described in detail here.

For example, a network node such as the UPF etc. may determine the priority of the downlink data and may add an IE of "Flow Priority" in a GTP-U data packet header of the downlink data. The UPF may use the IE to indicate how important the data carried by the data packet is for the UE. Therefore, the AN may decide whether to initiate a RAN Paging procedure immediately according to the IE. It should be illustrated that the technical solutions according to the embodiments of the present disclosure are not limited thereto, and it may be determined whether to buffer the downlink data according to any other feasible manner (for example, but not limited to, a buffer capacity, a data transmission scheduling policy, etc.)

The paging initiation determination module 430 is configured to, when it is determined that the downlink data is to be buffered, if the first node is a first type of node, determine that a paging procedure is not to be initiated for the UE in the non-connected state, or if the first node is a second type of node, notify the second node that the downlink data has been buffered, so that the second node determines that the paging procedure is not to be initiated for the UE in the non-connected state.

The above notification to the second node may be IEs of a "Gateway buffered data indication", an "AN buffered data indication", or any message or information which may implement a similar function, and the present disclosure is not limited by a specific implementation.

Alternatively, the paging initiation determination module 430 may further be configured to: determine, based on occurrence of a predefined event, that the buffered data is to be transmitted to the UE in the non-connected state. Here, the predefined event may comprise, but not limited to, at least one of: the UE actively returning to a connected state, occurrence of downlink data to be transmitted immediately (for example, data of a high priority for the UE), timeout of a predefined timer, and an event that a predefined upper limit of the buffered data has been reached.

In some examples, if the first node is the first type of node, after determining that the downlink data is to be buffered, the second node may further be notified through a transmission module 450 that the downlink data has been buffered.

In some examples, a notification to the second node may carry an information element indicating that the data is buffered by the first node.

In some examples, the transmission module 450 may be configured to transmit, to a third node, a message carrying an information element indicating that the data is buffered by the first node, so that the third node notifies the second node that the data is buffered by the first node.

In some examples, the first type of node may be an Access Node (AN), the second type of node may be an User Plane Functional entity (UPF), the second node may be an Access Mobility management Functional entity (AMF), and the third node may be a Session Management Functional entity (SMF). However, the technical solutions according to the embodiments of the present disclosure are not limited thereto, and the first type of node, the second type of node, the second node, and the third node may also be corresponding nodes which have similar functions in an existing communication system or a future communication system, respectively, and should not be limited to the AN, the UPF, or the AMF.

In some examples, the UE actively returning to a connected state may comprise the UE updating its registration area (for example, entering a new registration area). In this case, the device shown in FIG. 4 may further comprise a session creation assist module 440 configured to assist in creation of a user plane session between the UE and the updated registration area, so that the buffered data may be transmitted using the created user plane session.

The first node illustrated in FIG. 4 may correspond to the first node 1000 illustrated in FIG. 10. The transceiver 1020 of the first node 1000 may comprise the receiving module 410 and the transmission module 450, or perform the operations performed by the receiving module 410 and the transmission module 450. The processor 1010 of the first node 1000 may comprise the data buffer determination module 420, the paging initiation determination module 430, and the session creation assist module 440, or perform the operations performed by the data buffer determination module 420, the paging initiation determination module 430, and the session creation assist module 440.

FIG. 5 illustrates a schematic block diagram of a second node for transmitting data according to an embodiment of the present disclosure.

As shown in FIG. 5, the second node comprises a notification receiving module 510. The notification receiving module 510 is configured to receive a notification indicating that downlink data to be transmitted to a User Equipment (UE) in a non-connected state has been buffered at a first node.

The above notification to the second node may be IEs of a "Gateway buffered data indication", an "AN buffered data indication", or any message or information which may implement a similar function, and the present disclosure is not limited by a specific implementation.

Alternatively, the second node may comprise a paging initiation determination module 520. The paging initiation determination module 520 is configured to determine, based on the notification, that a paging procedure is not to be initiated for the UE in the non-connected state.

Alternatively, the paging initiation determination module 520 may further be configured to determine, based on occurrence of a predefined event, that the buffered data is to be transmitted to the UE in the non-connected state. Here, the predefined event may comprise, but not limited to, at least one of: the UE actively returning to a connected state, occurrence of downlink data to be transmitted immediately (for example, data of a high priority for the UE), timeout of a predefined timer, and an event that a predefined upper limit of the buffered data has been reached.

In some examples, the notification is received by the notification receiving module 510 from the first node via a third node, and the notification receiving module 510 may further be configured to receive, from the third node, a message comprising an information element indicating a forwarding data channel address of the first node.

In some examples, the device shown in FIG. 5 may further comprise a transmission module 540, configured to transmit, to another second node, a message comprising an information element indicating that the data is buffered by the first node and/or the message comprising the information element indicating the forwarding data channel address of the first node, so that the other second node forwards the message to another third node.

In some examples, the other second node is a second node to which the UE connects when the UE updates its registration area, and the message which is transmitted to the other second node and comprises the information element indicating that the data is buffered by the first node is used to trigger the other second node to initiate a Packet Data Unit (PDU) session establishment procedure.

In some examples, the first node may be an User Plane Functional entity (UPF), the second node and the other second node may be Access Mobility management Functional entities (AMF), and the third node and the other third node may be Session Management Functional entities (SMF). However, the technical solutions according to the embodiments of the present disclosure are not limited thereto, and the first node, the second node, and the third node may also be corresponding nodes which have similar functions in an existing communication system or a future communication system, respectively, and should not be limited to the UPF, the AMF, or the SMF.

In some examples, the UE actively returning to a connected state may comprise the UE updating its registration area (for example, entering a new registration area). In this case, the device shown in FIG. 5 may further comprise a session creation assist module 530, configured to assist in creation of a user plane session between the UE and the updated registration area, so that the buffered data may be transmitted using the created user plane session.

The second node illustrated in FIG. 5 may correspond to the second node 1100 illustrated in FIG. 11. The transceiver 1120 of the second node 1100 may comprise the notification receiving module 510 and the transmission module 540, or perform the operations performed by the notification receiving module 510 and the transmission module 540. The processor 1110 of the second node 1100 may comprise the paging initiation determination module 520 and the session creation assist module 530, or perform the operations performed by the paging initiation determination module 520 and the session creation assist module 530.

The technical solutions according to the embodiments of the present disclosure are separately described below as two cases, i.e., a case where the first node is a UPF and a case where the first node is an AN. It is to be illustrated that the following description is just a specific example for implementing the embodiments of the present disclosure, and should not be construed as limiting the protection scope of the present disclosure. In addition, in the following description, although a specific message/message name is taken as an example to illustrate a specific implementation of the embodiments of the present disclosure, it should be appreciated that in other implementations, an existing message having a different name from that of the message or even a new message may also be used to implement the technical solutions according to the embodiments of the present disclosure, and the scope of the present disclosure is not limited by the specific message/message name.

After the UE enters a CM-IDLE state and then the UPF receives downlink data for the UE, the UPF may not require an indication of an SMF, and may decide whether to temporarily buffer the data on the UPF by itself (in a case where the UE is not expected to re-create a plane). However, the UPF still needs to transmit a DDN to the SMF to notify the SMF that there is data buffered on the UPF. The SMF also needs to notify the AMF that there is data buffered on the UPF. At that time, the AMF may not start a Paging procedure. In this case, the downlink data is buffered on the UPF while the UE is still maintained in the CM-IDLE state.

After the UE enters a RRC-INACTIVE state and then the AN receives the downlink data for the UE, the AN may decide to buffer the data in the AN without initiating a RAN Paging procedure. In this case, the downlink data is buffered in the AN while the UE is still maintained in the RRC-INACTIVE state.

The UE is maintained in the non-connected state (for example, the CM-IDLE state or the RRC-INACTIVE state) in the above manner, which reduces a number of times the UE is woken up through paging signaling after the UE enters the CM-IDLE state to re-enter a CM-CONNECTED state, and/or reduces a number of times the UE is woken up by a RAN Paging procedure after the UE enters the RRC-INACTIVE state to re-enter a RRC-CONNECTED state, thereby achieving energy saving at the UE.

The method according to the embodiments of the present application may comprise one or more of the following operations.

1. An UPF decides to temporarily buffer the data on the UPF by itself, and transmits a DDN to a SMF. An IE of "Gateway buffered data indication" is added in the DDN signaling, to notify the SMF that there is downlink data buffered on the UPF.

2. A SMF may notify an AMF that there is downlink data buffered on an UPF using N11 signaling. Specifically, the IE of "Gateway buffered data indication" is added in the N11 signaling transmitted from the SMF to the AMF. The N11 signaling may be a Namf_Communication_N1N2MessageTransfer Response.

3. An AMF may notify another AMF that there is downlink data buffered on an UPF using N14 signaling between different AMFs. Specifically, the IE of "Gateway buffered data indication" is added in the N14 signaling transmitted from the AMF to the other AMF. The N14 signaling may be a Namf_Communication_UEContextTransfer Response.

4. A SMF may notify an AMF of a forwarding data channel address in an UPF using the N11 signaling. Specifically, an IE of "CN forwarding tunnel information" is added in the N11 signaling transmitted from the SMF to the AMF. The N11 signaling may be a Nsmf_PDUSession_CreateSMContext Response.

5. An AMF may notify another AMF of the forwarding data channel address in an UPF using the N14 signaling between different AMFs. Specifically, the IE of "CN forwarding tunnel information" is added in the N14 signaling transmitted from the AMF to another AMF. The N14 signaling may be a Namf_Communication_UEContextTransfer or Namf_Communication_UEContextTransfer Response.

6. An AMF may notify a SMF of the forwarding data channel address in an UPF using the N11 signaling. Specifically, the IE of "CN forwarding tunnel information" is added in the N11 signaling transmitted from the AMF to the SMF. The N11 signaling may be a Nsmf_PDUSession_UpdateSMContext or Nsmf_PDUSession_UpdateSMContext Response.

7. If the downlink data is buffered on an UPF and the UE is still maintained in the CM-IDLE state, when a predefined event occurs, the UPF may notify a SMF according to an existing mechanism, then the SMF notifies an AMF, and the AMF initiates a Paging procedure. The predefined event comprises, but not limited to, the UE actively returning to, for example, a CM-CONNECTED state, or decision of the UPF that operations are performed according to the existing mechanism because of new downlink data, or timeout of a predefined timer, or an event that a predefined upper limit of the buffered data has been reached.

8. An IE of "Flow Priority" may be added in a GTP-U data packet header of the downlink data. An UPF may use the IE to indicate how important the data carried by the data packet is for the UE. The AN may decide whether to initiate a RAN Paging procedure immediately according to the IE. As described above, any other feasible manners are also possible.

9. The AN may notify an AMF that there is downlink data buffered in the AN using N2 signaling. Specifically, an IE of "AN buffered data indication" is added in the N2 signaling transmitted from the AN to the AMF. The N2 signaling may be an UE Notification.

10. An AMF may notify another AMF that there is downlink data buffered in the AN using the N14 signaling between different AMFs. Specifically, the IE of "AN buffered data indication" is added in the N14 signaling transmitted from the AMF to the other AMF. The N14 signaling may be a Namf_Communication_UEContextTransfer Response.

11. If the downlink data is buffered in the AN and the UE is still maintained in a RRC-INACTIVE state, the AN may initiate the RAN Paging procedure according to the existing mechanism when a predefined event occurs. The predefined event comprises, but not limited to, the UE actively returning to, for example, a RRC-CONNECTED state, or decision of the AN that operations are performed according to the existing mechanism because of new downlink data, or timeout of a predefined timer, or an event that a predefined upper limit of the buffered data has been reached.

The above operations are just specific examples provided for explaining the technical solutions according to the embodiments of the present disclosure, and should not be construed as limiting the protection scope of the present disclosure. For example, when there is no switching between the AMF and the SMF in the communication system, the above operations 3, 5, 10, etc. may not be included. For example, in some specific implementations, the above operations 7, 11, etc. may also be omitted. For example, the operations 1-6 and the operations 7-11 may be performed in any relative order according to specific conditions.

After the AN and the UPF buffer the data and the AN or the AMF decides not to transmit the paging message, as described above, the buffered data may be transmitted to the UE when some predefined events occur. As an example of the UE actively returning to the connected state, the UE may enter a new registration area and update the registration area. A specific process of transmitting the buffered data to the UE will be described below by taking the case where the UE updates the registration area as an example. It is to be illustrated that the following embodiments are merely illustrative of specific examples of the technical solutions according to the present disclosure, and should not be construed as limiting the protection scope of the present disclosure.

In a first embodiment, a case where after the UPF receives the downlink data but the AMF decides not to start the paging procedure when the UE is in the CM-IDLE state, the UE enters a new registration area is described. In this embodiment, it is assumed that the UE is allocated to a new AMF, a new SMF, and a new UPF, and the original SMF may communicate with the new SMF.

FIGS. 6A and 6B illustrate schematic flowcharts of one specific implementation of a method for transmitting data according to an embodiment of the present disclosure in this case. As shown in FIGS. 6A and 6B, the specific implementation comprises the following steps.

In step 601, after the UE enters the CM-IDLE state, the original UPF receives downlink data. The original UPF decides to buffer the downlink data. The original UPF transmits a Data Notification to the original SMF, wherein the message carries a relevant session ID and a gateway buffered data indication, but is not limited to these contents.

In step 602, the original SMF transmits a Data Notification Ack to the original UPF.

In step 603, the original SMF transmits a Namf_Communication_N1N2MessageTransfer to the original AMF. The message should carry the relevant session ID and the gateway buffered data indication, but is not limited to these contents.

In step 604, the original AMF transmits a Namf_Communication_N1N2MessageTransfer Response to the original SMF.

In step 605, the UE moves to a new registration area in the CM-IDLE state. The UE transmits a registration request to the new AMF through the AN.

In step 606, the new AMF transmits a Namf_Communication_UEContextTransfer to the original AMF. The message should carry the above registration request, but is not limited to these contents.

In step 607, the original AMF transmits a Namf_Communication_UEContextTransfer Response to the new AMF. The message should carry a mobility management context and SMF information, but is not limited to these contents. The SMF information should carry the relevant session ID and the gateway buffered data indication, but is not limited to these contents.

In step 608, the UE completes identification, authentication, security, UDM-related procedures, PCF-related procedures etc. It can be illustrated here that an arrow on the right of step 608 does not point to a particular network entity. Such an indication manner herein means that there may also be network entities which are not shown in the figure and are involved in this step.

In step 609, the new AMF transmits a Registration Accept to the UE through the AN.

In step 610, the UE transmits a Registration Complete to the new AMF through the AN.

In step 611, the new AMF transmits a Nsmf_PDUSession_CreateSMContext Request to the new SMF. The creation request is transmitted based on, for example, the gateway buffered data indication received by the new AMF from the original AMF, and thereby a PDU session establishment procedure is initiated.

In step 612, the new SMF transmits a Nsmf_PDUSession_CreateSMContext Response to the new AMF.

In step 613, the new SMF transmits a N4 Session Establishment Request to the new UPF.

In step 614, the new UPF transmits a N4 Session Establishment Response to the new SMF. The message should carry CN channel information, but is not limited to these contents. The CN channel information is allocated by the new UPF.

In step 615, the new SMF transmits a Nsmf_PDUSession_Update to the original SMF. The message should carry the above CN channel information, but is not limited to these contents.

In step 616, the original SMF transmits a N4 Session Modification Request to the original UPF. The message should carry the above CN channel information, but is not limited to these contents.

In step 617, the original UPF transmits a N4 Session Modification Response to the original SMF. The message should carry the CN channel information, but is not limited to these contents. The CN channel information is allocated by the original UPF.

In step 618, the original SMF transmits a Nsmf_PDUSession_Update Response to the new SMF. The message should carry the CN channel information allocated by the original UPF, but is not limited to these contents.

In step 619, the new SMF transmits the N4 Session Modification Request to the new UPF. The message should carry the CN channel information allocated by the original UPF, but is not limited to these contents.

In step 620, the new UPF transmits the N4 Session Modification Response to the new SMF.

In step 621, the new SMF transmits Namf_Communication_N1N2MessageTransfer to the new AMF.

In step 622, the new AMF transmits an Namf_Communication_N1N2MessageTransfer Response to the new SMF.

In step 623, the new AMF transmits a N2 PDU Session Resource Setup Request to the AN.

In step 624, the UE completes an RRC connection reconfiguration procedure with the AN.

In step 625, the AN transmits a N2 PDU Session Resource Setup Response to the new AMF.

In step 626, the new AMF transmits a Nsmf_PDUSession_UpdateSMContext Request to the new SMF.

In step 627, the new SMF transmits the N4 Session Modification Request to the new UPF.

In step 628, the new UPF transmits the N4 Session Modification Response to the new SMF.

In step 629, the new SMF transmits a Nsmf_PDUSession_UpdateSMContext Response to the new AMF. At that time, the downlink data buffered by the original UPF may be transmitted to the UE through the new UPF and the AN.

In a second embodiment, a case where after the UPF receives the downlink data but the AMF decides not to start the paging procedure when the UE is in the CM-IDLE state, the UE enters a new registration area is described. In this embodiment, it is assumed that the UE is allocated to a new AMF, a new SMF, and a new UPF, and the original SMF cannot communicate with the new SMF. FIGS. 7A and 7B illustrate schematic flowcharts of another specific implementation of a method for transmitting data according to an embodiment of the present disclosure in this case. As shown in FIGS. 7A and 7B, the specific implementation comprises the following steps.

In step 701, after the UE enters the CM-IDLE state, the original UPF receives downlink data. The original UPF decides to buffer the downlink data. The original UPF transmits a Data Notification to the original SMF, wherein the message should carry a relevant session ID and a gateway buffered data indication, but is not limited to these contents.

In step 702, the original SMF transmits a Data Notification Ack to the original UPF.

In step 703, the original SMF transmits a Namf_Communication_N1N2MessageTransfer to the original AMF. The message should carry the relevant session ID and the gateway buffered data indication, but is not limited to these contents.

In step 704, the original AMF transmits a Namf_Communication_N1N2MessageTransfer Response to the original SMF.

In step 705, the UE moves to a new registration area in the CM-IDLE state. The UE transmits a registration request to the new AMF through the AN.

In step 706, the new AMF transmits A Namf_Communication_UEContextTransfer to the original AMF. The message should carry the above registration request, but is not limited to these contents.

In step 707, the original AMF transmits a Namf_Communication_UEContextTransfer Response to the new AMF. The message should carry a mobility management context and SMF information, but is not limited to these contents. The SMF information should carry the relevant session ID and the gateway buffered data indication, but is not limited to these contents.

In step 708, the UE completes identification, authentication, security, UDM-related procedures, PCF-related procedures etc.

In step 709, the new AMF transmits a Registration Accept to the UE through the AN.

In step 710, the UE transmits a Registration Complete to the new AMF through the AN.

In step 711, the new AMF transmits a Nsmf_PDUSession_CreateSMContext Request to the new SMF.

In step 712, the new SMF transmits a N4 Session Establishment Request to the new UPF.

In step 713, the new UPF transmits a N4 Session Establishment Response to the new SMF. The message should carry CN channel information, but is not limited to these contents. The CN channel information is allocated by the new UPF.

In step 714, the new SMF transmits a Nsmf_PDUSession_CreateSMContext Response to the new AMF. The message should carry the CN channel information allocated by the new UPF, but is not limited to these contents.

In step 715, the new AMF transmits the a Namf_Communication_UEContextTransfer to the original AMF. The message should carry the CN channel information allocated by the new UPF, but is not limited to these contents.

In step 716, the original AMF transmits a Nsmf_PDUSession_UpdateSMContext Request to the original SMF. The message should carry the CN channel information allocated by the new UPF, but is not limited to these contents.

In step 717, the original SMF transmits a N4 Session Modification Request to the original UPF. The message should carry the CN channel information allocated by the new UPF, but is not limited to these contents.

In step 718, the original UPF transmits a N4 Session Modification Response to the original SMF. The message should carry the CN channel information, but is not limited to these contents. The CN channel information is allocated by the original UPF.

In step 719, the original SMF transmits a Nsmf_PDUSession_UpdateSMContext Response to the original AMF. The message should carry the CN channel information allocated by the original UPF, but is not limited to these contents.

In step 720, the original AMF transmits the Namf_Communication_UEContextTransfer Response to the new AMF. The message should carry the CN channel information allocated by the original UPF, but is not limited to these contents.

In step 721, the new AMF transmits the Nsmf_PDUSession_UpdateSMContext Request to the new SMF. The message should carry CN channel information allocated by the original UPF, but is not limited to these contents.

In step 722, the new SMF transmits the N4 Session Modification Request to the new UPF. The message should carry the CN channel information allocated by the original UPF, but is not limited to these contents.

In step 723, the new UPF transmits the N4 Session Modification Response to the new SMF.

In step 724, the new SMF transmits the Nsmf_PDUSession_UpdateSMContext Response to the new AMF.

In step 725, the new SMF transmits a Namf_Communication_N1N2MessageTransfer to the new AMF.

In step 726, the new AMF transmits a Namf_Communication_N1N2MessageTransfer Response to the new SMF.

In step 727, the new AMF transmits a N2 PDU Session Resource Setup Request to the AN.

In step 728, the UE completes an RRC connection reconfiguration procedure with the AN.

In step 729, the AN transmits a N2 PDU Session Resource Setup Response to the new AMF.

In step 730, the new AMF transmits the Nsmf_PDUSession_UpdateSMContext Request to the new SMF.

In step 731, the new SMF transmits the N4 Session Modification Request to the new UPF.

In step 732, the new UPF transmits the N4 Session Modification Response to the new SMF.

In step 733, the new SMF transmits the Nsmf_PDUSession_UpdateSMContext Response to the new AMF. At that time, the downlink data buffered by the original UPF may be transmitted to the UE through the new UPF and the AN.

In a third embodiment, a case where after the AN receives the downlink data but the AN decides not to start the RAN paging procedure when the UE is in the RRC-INACTIVE state, the UE enters a new registration area is described. In this embodiment, it is assumed that the UE is connected to a new AN, and is allocated to a new AMF, a new SMF, and a new UPF. FIGS. 8A and 8B illustrate schematic flowcharts of another specific implementation of a method for transmitting data according to an embodiment of the present disclosure in this case. As shown in FIGS. 8A and 8B, the specific implementation comprises the following steps.

In step 801, the UE is in the RRC-INACTIVE state, the AN receives downlink data, but the AN decides not to start the RAN Paging procedure. The AN buffers the downlink data.

In step 802, the UE enters a new registration area in the RRC-INACTIVE state. The UE transmits a registration request to the new AMF through the AN.

In step 803, the new AMF transmits a Namf_Communication_UEContextTransfer to the original AMF. The message should carry the above registration request, but is not limited to these contents.

In step 804, the original AMF transmits a N2 message to the original AN. The N2 message may be a UE State Transition Notification Request.

In step 805, the original AN transmits a N2 message to the original AMF. The N2 message may be a UE notification. The message should carry an AN buffered data indication, but is not limited to these contents.

In step 806, the original AMF transmits a Namf_Communication_UEContextTransfer Response to the new AMF. The message should carry a mobility management context and SMF information, but is not limited to these contents. The SMF information should carry the relevant session ID and the AN buffered data indication, but is not limited to these contents.

In step 807, the UE completes identification, authentication, security, UDM-related procedures, PCF-related procedures etc.

In step 808, the new AMF transmits a Registration Accept to the UE through the AN.

In step 809, the UE transmits a Registration Complete to the new AMF through the AN.

In step 810, after step 806, the original AMF may transmit a Nsmf_PDUSession_UpdateSMContext Request to the original SMF.

In step 811, the original SMF transmits a N4 Session Modification Request to the original UPF.

In step 812, the original UPF transmits a N4 Session Modification Response to the original SMF. The message should carry N3 interface orientated data channel information allocated by the original UPF, but is not limited to these contents.

In step 813, the original SMF transmits a Nsmf_PDUSession_UpdateSMContext Response to the original AMF. The message should carry the N3 interface orientated data channel information allocated by the original UPF, but is not limited to these contents.

In step 814, the original AMF transmits a N2 message to the original AN. The message may be a PDU session resource modification request on the N2 interface. The message should carry the N3 interface orientated data channel information allocated by the original UPF, but is not limited to these contents.

In step 815, the original AN transmits a N2 message to the original AMF. The message may be a PDU session resource modification response on the N2 interface. At that time, the original AN may transmit the buffered downlink data to the original UPF.

In step 816, after step 806, the new AMF transmits a Nsmf_PDUSession_CreateSMContext Request to the new SMF.

In step 817, the new SMF transmits a Nsmf_PDUSession_CreateSMContext Response to the new AMF.

In step 818, the new SMF transmits a N4 Session Establishment Request to the new UPF.

In step 819, the new UPF transmits a N4 Session Establishment Response to the new SMF. The message should carry the N3 interface orientated data channel information and CN channel information, but is not limited to these contents. The N3 interface orientated data channel information and the CN channel information are allocated by the new UPF.

In step 820, the new SMF transmits a Nsmf_PDUSession_Update to the original SMF. The message should carry the CN channel information allocated by the new UPF, but is not limited to these contents.

In step 821, the original SMF transmits the N4 Session Modification Request to the original UPF. The message should carry the CN channel information allocated by the new UPF, but is not limited to these contents.

In step 822, the original UPF transmits the N4 Session Modification Response to the original SMF. The message should carry the CN channel information, but is not limited to these contents. The CN channel information is allocated by the original UPF.

In step 823, the original SMF transmits a Nsmf_PDUSession_Update Response to the new SMF. The message should carry the CN channel information allocated by the original UPF, but is not limited to these contents.

In step 824, the new SMF transmits the N4 Session Modification Request to the new UPF. The message should carry the CN channel information allocated by the original UPF, but is not limited to these contents.

In step 825, the new UPF transmits the N4 Session Modification Response to the new SMF. At that time, the original UPF may forward the buffered data to the new UPF.

In step 826, the new SMF transmits a Namf_Communication_N1N2MessageTransfer to the new AMF. The message should carry the N3 interface orientated data channel information allocated by the new UPF, but is not limited to these contents.

In step 827, the new AMF transmits a Namf_Communication_N1N2MessageTransfer Response to the new SMF.

In step 828, the new AMF transmits a N2 PDU Session Resource Setup Request to the new AN. The message should carry the N3 interface orientated data channel information allocated by the new UPF, but is not limited to these contents.

In step 829, the UE completes an RRC connection reconfiguration procedure with the AN.

In step 830, the new AN transmits a N2 PDU Session Resource Setup Response to the new AMF. The message should carry the N3 interface orientated data channel information allocated by the new AN, but is not limited to these contents.

In step 831, the new AMF may transmit a Nsmf_PDUSession_UpdateSMContext Request to the new SMF. The message should carry the N3 interface orientated data channel information allocated by the new AN, but is not limited to these contents.

In step 832, the new SMF transmits the N4 Session Modification Request to the new UPF. The message should carry the N3 interface orientated data channel information allocated by the new AN, but is not limited to these contents.

In step 833, the new UPF transmits the N4 Session Modification Response to the new SMF. At that time, the data buffered by the new UPF may be transmitted to the UE through the new AN.

In step 834, the new SMF transmits the Nsmf_PDUSession_UpdateSMContext Response to the new AMF.

In step 835, after a predefined event occurs, the original AN may transmit a N2 UE Context Release Request to the original AMF. The predefined event may be completion of forwarding of the data buffered on the original AN by the original AN, or timeout of a predefined timer.

In step 836, the original AMF may transmit a N2 UE Context Release Command to the original AN.

In step 837, the original AN may transmit a N2 UE Context Release Complete to the original AMF.

In step 838, the original AMF may transmit a Nsmf_PDUSession_UpdateSMContext Request to the original SMF.

In step 839, the original SMF transmits the N4 Session Modification Request to the original UPF.

In step 840, the original UPF transmits the N4 Session Modification Response to the original SMF.

In step 841, the original SMF transmits the Nsmf_PDUSession_UpdateSMContext Response to the original AMF.

FIG. 9 schematically illustrates a block diagram of a device 900 according to an embodiment of the present disclosure. The device 900 comprises a processor 910, for example, a Digital Signal Processor (DSP). The processor 910 may be a single apparatus or multiple apparatuses for performing different actions according to the embodiments of the present disclosure. The device 900 may further comprise an Input/Output (I/O) apparatus 930 configured to receive signals from other entities or transmit signals to other entities.

In addition, the device 900 comprises a memory 920 which may be in a form of non-volatile or volatile memory, for example, an Electrically Erasable Programmable Read Only Memory (EEPROM), a flash memory, etc. The memory 920 has computer readable instructions stored thereon, which when executed by the processor 910, cause the processor to perform the method according to the embodiments of the present disclosure.

The device illustrated in FIG. 9 may correspond to the device 1200 illustrated in FIG. 12. The transceiver 1220 of the device 1200 may comprise the Input/Output (I/O) apparatus 930 or perform the operations performed by the Input/Output (I/O) apparatus 930. The processor 1210 of the device 1200 may comprise the processor 910 or perform the operations performed by the processor 910. The memory 1230 of the device 1200 may comprise the memory 920 or perform the operations performed by the memory 920.

FIG. 10 schematically illustrates a block diagram of a first node 1000 according to an embodiment of the present disclosure.

The first nodes described above may correspond to the first node 1000. For example, the first nodex illustrated in FIG. 4 may correspond to the first node 1000.

Referring to the FIG. 10, the first node 1000 may include a processor 1010, a transceiver 1020 and a memory 1030. However, all of the illustrated components are not essential. The first node 1000 may be implemented by more or less components than those illustrated in FIG. 10. In addition, the processor 1010 and the transceiver 1020 and the memory 1030 may be implemented as a single chip according to another embodiment.

The aforementioned components will now be described in detail.

The processor 1010 may include one or more processors or other processing devices that control the proposed function, process, and/or method. Operation of the first node 1000 may be implemented by the processor 1010.

The processor 1010 may detect a PDCCH on a configured control resource set. The processor 1010 determines a method for dividing CBs and a method for rate matching of a PDSCH according to the PDCCH. The processor 1010 may control the transceiver 1020 to receive the PDSCH according to the PDCCH. The processor 1010 may generate HARQ-ACK information according to the PDSCH. The processor 1010 may control the transceiver 1020 to transmit the HARQ-ACK information.

The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the first node 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

FIG. 11 schematically illustrates a block diagram of a second node 1100 according to an embodiment of the present disclosure.

The second nodes described above may correspond to the second node 1100. For example, the second node illustrated in FIG. 5 may correspond to the second node 1100.

Referring to the FIG. 11, the second node 1100 may include a processor 1110, a transceiver 1120 and a memory 1130. However, all of the illustrated components are not essential. The second node 1100 may be implemented by more or less components than those illustrated in FIG. 11. In addition, the processor 1110 and the transceiver 1120 and the memory 1130 may be implemented as a single chip according to another embodiment.

The aforementioned components will now be described in detail.

The processor 1110 may include one or more processors or other processing devices that control the proposed function, process, and/or method. Operation of the second node 1100 may be implemented by the processor 1110.

The processor 1110 may detect a PDCCH on a configured control resource set. The processor 1110 determines a method for dividing CBs and a method for rate matching of a PDSCH according to the PDCCH. The processor 1110 may control the transceiver 1120 to receive the PDSCH according to the PDCCH. The processor 1110 may generate HARQ-ACK information according to the PDSCH. The processor 1110 may control the transceiver 1120 to transmit the HARQ-ACK information.

The transceiver 1120 may include a RF transmitter for up-converting and amplifying a transmitted signal, and a RF receiver for down-converting a frequency of a received signal. However, according to another embodiment, the transceiver 1120 may be implemented by more or less components than those illustrated in components.

The transceiver 1120 may be connected to the processor 1110 and transmit and/or receive a signal. The signal may include control information and data. In addition, the transceiver 1120 may receive the signal through a wireless channel and output the signal to the processor 1110. The transceiver 1120 may transmit a signal output from the processor 1110 through the wireless channel.

The memory 1130 may store the control information or the data included in a signal obtained by the second node 1100. The memory 1130 may be connected to the processor 1110 and store at least one instruction or a protocol or a parameter for the proposed function, process, and/or method. The memory 1130 may include read-only memory (ROM) and/or random access memory (RAM) and/or hard disk and/or CD-ROM and/or DVD and/or other storage devices.

FIG. 12 schematically illustrates a block diagram of a device 1200 according to an embodiment of the present disclosure.

The devices or UEs described above may correspond to the device 1200. For example, the device illustrated in FIG. 9 may correspond to the device 1200.

Referring to the FIG. 12, the device 1200 may include a processor 1210, a transceiver 1220 and a memory 1230. However, all of the illustrated components are not essential. The device 1200 may be implemented by more or less components than those illustrated in FIG. 12. In addition, the processor 1210 and the transceiver 1220 and the memory 1230 may be implemented as a single chip according to another embodiment.

The aforementioned components will now be described in detail.

The processor 1210 may include one or more processors or other processing devices that control the proposed function, process, and/or method. Operation of the device 1200 may be implemented by the processor 1210.

The processor 1210 may detect a PDCCH on a configured control resource set. The processor 1210 determines a method for dividing CBs and a method for rate matching of a PDSCH according to the PDCCH. The processor 1210 may control the transceiver 1220 to receive the PDSCH according to the PDCCH. The processor 1210 may generate HARQ-ACK information according to the PDSCH. The processor 1210 may control the transceiver 1220 to transmit the HARQ-ACK information.

The transceiver 1220 may include a RF transmitter for up-converting and amplifying a transmitted signal, and a RF receiver for down-converting a frequency of a received signal. However, according to another embodiment, the transceiver 1220 may be implemented by more or less components than those illustrated in components.

The transceiver 1220 may be connected to the processor 1210 and transmit and/or receive a signal. The signal may include control information and data. In addition, the transceiver 1220 may receive the signal through a wireless channel and output the signal to the processor 1210. The transceiver 1220 may transmit a signal output from the processor 1210 through the wireless channel.

The memory 1230 may store the control information or the data included in a signal obtained by the device 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices. It can be understood by those skilled in the art that the methods described above are merely exemplary. The method according to the present disclosure is not limited to the steps and sequences described above. The device described above may comprise more modules, for example, may further comprise modules which have been developed or will be developed in the future for base stations or UEs, etc. Various identifications described above are merely exemplary and not restrictive, and the present disclosure is not limited to specific cells as examples of such identifications. Many variations and modifications can be made by those skilled in the art in light of the teachings of the illustrated embodiments.

It should be understood that the embodiments of the present disclosure described above may be implemented by software, hardware, or a combination thereof. For example, various components within the device in the embodiments described above may be implemented by various devices including, but not limited to, analog circuit devices, digital circuit devices, Digital Signal Processing (DSP) circuits, programmable processors, Application-Specific Integrated Circuits (ASICs), Field Programmable Gate Arrays (FPGAs), Programmable Logic Devices (CPLDs), etc.

In the present application, "base station" refers to a mobile communication data and control switching center having a large transmission power and a relatively large coverage area, which has functions such as resource allocation scheduling, data reception and transmission, etc. "User Equipment" refers to a user mobile terminal, for example, a terminal device which comprises a mobile phone, a notebook, etc., and may communicate wirelessly with a base station or a micro-base station.

Further, the embodiments of the present disclosure disclosed here may be implemented on a computer program product. More specifically, the computer program product is a product having a computer readable medium encoded with a computer program logic which, when executed on a computing device, provides related operations to implement the technical solutions of the present disclosure. When executed on at least one processor of a computing system, the computer program logic causes the processor to perform the operations (methods) described in the embodiments of the present disclosure. Such an arrangement according to the present disclosure is typically provided as software, codes and/or other data structures, disposed or encoded on a computer readable medium such as an optical medium (for example, CD-ROM), a floppy disk, or a hard disk etc., firmware or other media for micro-codes on one or more ROM or RAM or PROM chips, or downloadable software images, shared databases, etc. in one or more modules. The software or firmware or such a configuration may be installed on the computing device, so that one or more processors in the computing device perform the technical solutions described in the embodiments of the present disclosure.

Although the present disclosure has been described above in combination with the preferred embodiments of the present disclosure, it will be understood that various modifications, alterations and changes may be made to the present disclosure without departing from the spirit and scope of the present disclosure. Therefore, the present disclosure should not be limited by the embodiments described above, but should be defined by the appended claims and equivalents thereof.

The invention claimed is:

1. A method performed at a third network entity for transmitting data, comprising:
   receiving, from a first network entity, a notification indicating that downlink data to be transmitted to a User Equipment (UE) in a non-connected state is buffered on the first network entity; and
   transmitting, to a second network entity, a message comprising an information indicating that the downlink data has been buffered on the first network entity.

2. The method according to claim 1, wherein the second network entity determines not to initiate a paging procedure for the UE in the non-connected state based on the message.

3. The method according to claim 1, wherein:
   the first network entity is a User Plane Functional (UPF) entity,
   the second network entity is an Access Mobility management Functional (AMF) entity, and
   the third network entity is a Session Management Functional (SMF) entity.

4. The method according to claim 1, further comprising:
   when the UE returns to a connected state, performing a procedure to transmit the buffered data to the UE.

5. The method according to claim 3, wherein the UE returning to a connected state comprises the UE entering to a new registration area.

6. The method according to claim 4, wherein the performing the procedure to transmit the buffered data to the UE comprises:
   when the UE is allocated to another third network entity, receiving, from the another third network entity, a message comprising an information indicating that a forwarding data channel address of the second network entity.

7. A method performed at a second network entity for transmitting data, comprising:
   receiving, from a third network entity, a message comprising an information indicating that downlink data to be transmitted to a User Equipment (UE) in a non-connected state is buffered by a first network entity; and
   determining, based on the message, not to initiate a paging procedure for the UE in the non-connected state.

8. The method according to claim 7, wherein:
   the first network entity is a User Plane Functional (UPF) entity,
   the second network entity is an Access Mobility management Functional (AMF) entity, and
   the third network entity is a Session Management Functional (SMF) entity.

9. The method according to claim 7, further comprising:
   when the UE returns to a connected state, performing a procedure to transmit the buffered data to the UE.

10. A third network entity in a wireless communication system, the third network entity comprising:
    a transceiver; and
    at least one processor configured to:
    control the transceiver to receive, from a first network entity, a notification indicating that downlink data to be transmitted to a User Equipment (UE) in a non-connected state is buffered on the first network entity, and
    control the transceiver to transmit, to a second network entity, a message comprising an information indicating that the downlink data has been buffered on the first network entity.

11. The third network entity according to claim 10, wherein:
    the first network entity is a User Plane Functional (UPF) entity,
    the second network entity is an Access Mobility management Functional (AMF) entity, and
    the third network entity is a Session Management Functional (SMF) entity.

12. The third network entity according to claim 10, wherein the at least one processor is further configured to:
    when the UE returns to a connected state, perform a procedure to transmit the buffered data to the UE.

13. The third network entity according to claim 12, wherein the UE returning to a connected state comprises the UE entering to a new registration area.

14. The third network entity according to claim 13, wherein the at least one processor is configured to:

when the UE is allocated to another third network entity, control the transceiver to receive, from the another third network entity, a message comprising an information indicating that a forwarding data channel address of the second network entity.

15. A second network entity in a wireless communication system, the second network entity comprising:
   a transceiver; and
   at least one processor configured to:
   control the transceiver to receive, from a third network entity, a message comprising an information indicating that downlink data to be transmitted to a User Equipment (UE) in a non-connected state is buffered by a first network entity, and
   determine, based on the message, not to initiate a paging procedure for the UE in the non-connected state.

* * * * *